United States Patent [19]

Stilling

[11] Patent Number: 4,491,615

[45] Date of Patent: Jan. 1, 1985

[54] COMPOSITE MOLDING STRUCTURE

[76] Inventor: Ludwig Stilling, 29 Barker Ave., Rexdale, Ontario, Canada, M9V 1E6

[21] Appl. No.: 455,874

[22] Filed: Jan. 5, 1983

[51] Int. Cl.[3] .......................... B32B 1/00; B32B 31/04

[52] U.S. Cl. .......................................... 428/33; 52/312; 52/716; 52/718; 206/575; 428/83; 428/101; 428/174

[58] Field of Search .................... 428/80, 83, 101, 174, 428/33; 52/242, 288, 312, 716, 718; 206/575

[56] References Cited

U.S. PATENT DOCUMENTS

| | | | |
|---|---|---|---|
| 2,589,304 | 3/1952 | Spangler | 189/34 |
| 2,711,231 | 6/1955 | Spangler | 189/34 |
| 2,814,999 | 12/1957 | Reeves | 108/13 |
| 3,332,192 | 7/1967 | Kessler et al. | 52/538 |
| 3,481,092 | 12/1969 | Constantino | 52/288 |
| 3,485,000 | 12/1969 | Fiquet | 52/80 |
| 3,952,461 | 4/1976 | Kinsey | 52/588 |
| 4,161,853 | 7/1979 | Weiss | 52/288 |

*Primary Examiner*—Paul J. Thibodeau
*Attorney, Agent, or Firm*—Ridout & Maybee

[57] ABSTRACT

A composite molding structure having transverse flexibility for forming curved architectural moldings and display enclosures comprises a plurality of elongate, flexible elements slidably interconnected in side by side relation with their longitudinal axes lying parallel to each other. Each element has a pair of flanges extending from opposite sides of a longitudinally extending web portion, the flanges defining together with the web portion a longitudinally extending channel conforming to the cross-sectional configuration of a flange of an adjacent element. The flange is keyed into the channel and is slidable therein upon transverse flexing of the assembled molding structure.

17 Claims, 5 Drawing Figures

COMPOSITE MOLDING STRUCTURE

FIELD OF THE INVENTION

This invention relates to composite molding structures composed of a plurality of elongate, slidably interconnected elements.

BACKGROUND OF THE INVENTION

In certain architectural applications it may be desirable to provide a molding or architectural member in a window or other opening of curved contour, to frame the opening with a band conforming to the contour of the opening, for strength or decoration. In other applications, it may be desirable to frame a two-dimensional display or sign blank having a curved edge with a molding having a decorative flange or band for retaining the display, and which conforms closely to the curved edge thereof.

It is difficult to form a molding or other unitary element of substantial cross-sectional thickness by transversely flexing the element because stresses are induced upon those flexed portions along the plane of the bend, due to the contraction and expansion of the inner and outer portions, respectively, relative to one another. Unless the element being formed has exceptional elasticity, the result is pleating, warping and/or tearing of the material.

Therefore, an object of the invention is to overcome, or at least to substantially reduce the effects of stresses induced in a molding or other structural member due to transverse flexing of the member, and to this end it is proposed to provide a composite molding structure having transverse flexibility.

SUMMARY OF THE INVENTION

In accordance with one aspect of the invention there is provided a composite, elongate molding structure having transverse flexibility, comprising a plurality of elongate, flexible elements assembled in side by side relation, said elements being slidably interconnected with their longitudinal axes lying parallel to each other, each element being of uniform cross-section throughout its length and comprising a longitudinally extending web portion and a pair of flanges extending laterally from the web portion on opposite sides thereof, each flange defining with a respective side of the web portion a longitudinally extending channel conforming to the cross-sectional configuration of a flange of an adjacent element, said flange of said adjacent element being keyed into the channel and slidable therein upon transverse flexing of the molding structure.

In accordance with another aspect of the invention there is provided a kit for making a composite elongate molding structure having transverse flexibility, comprising a plurality of elongate, flexible elements adapted to be assembled in side by side relation, said elements being slidably interconnectable with their longitudinal axes lying parallel to each other, each element being of uniform cross-section throughout its length and comprising a longitudinally extending web portion and a pair of flanges extending laterally from the web portion in opposite sides thereof, each flange defining with a respective side of the web portion a longitudinally extending channel conforming to the cross-sectional configuration of a flange of another of said elements, said flange of said another elements being adapted to be keyed into the channel, and slidable therein upon transverse flexing of the composite molding structure.

In accordance with yet another aspect of the invention there is provided a method of making a composite elongate molding structure, comprising:

- slidably interconnecting a plurality of elongate, flexible elements of uniform cross-sections along their lengths in a side-by-side relation with their longitudinal axes lying parallel to each other, thereby forming a composite molding structure;
- gripping one end of the composite molding structure; and
- bending the other end of the composite molding structure transversely, thereby causing the elongate flexible elements to slide upon each other.

BRIEF DESCRIPTION OF THE DRAWINGS

In order that the invention may be readily understood two preferred embodiments thereof will now be described by way of example with reference to the accompanying drawings, in which.

DESCRIPTION OF THE PREFERRED EMBODIMENT

Figure 1:
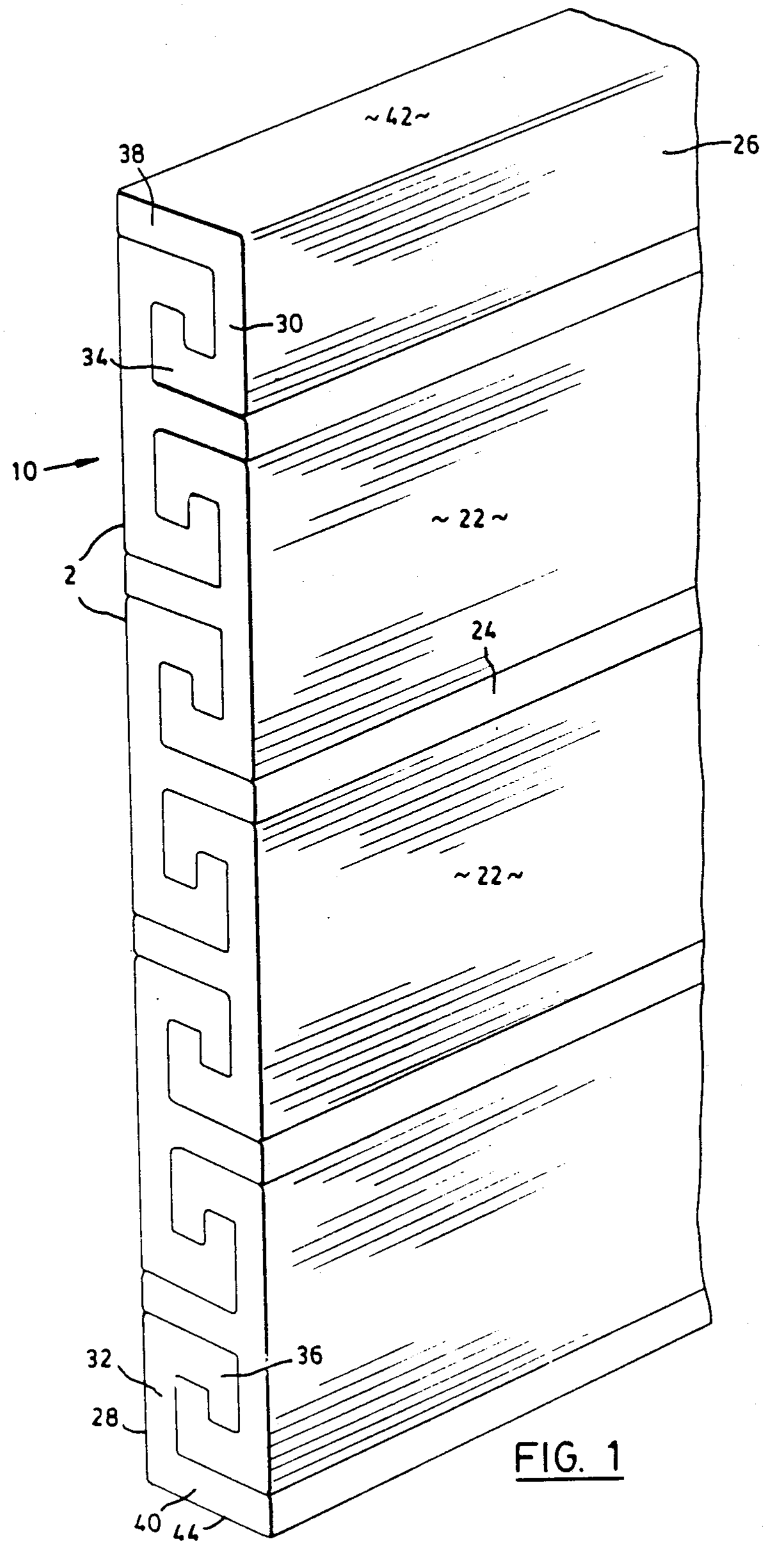
FIG. 1 is a perspective view of a composite structure of a plurality of structural elements in accordance with the invention.

In FIG. 1 a section of a composite, elongate molding structure 10 having transverse flexibility, comprises a plurality of elongate, flexible elements 2 assembled in side by side relation with their longitudinal axes lying parallel to each other so as to form an elongate bar or slab.

Figure 2:
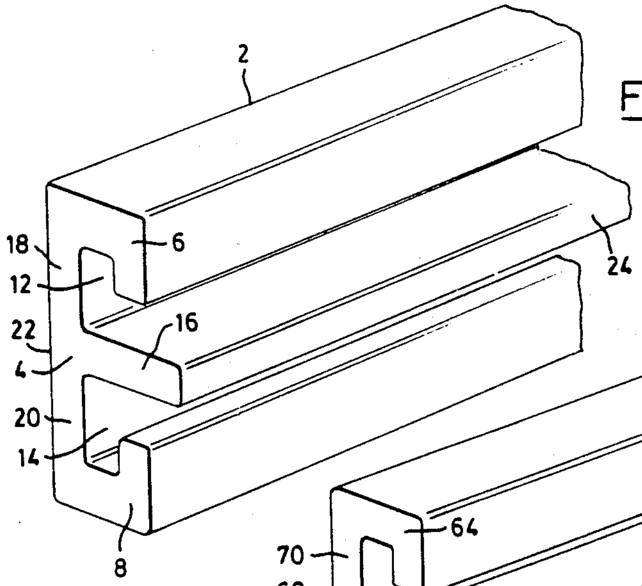
FIG. 2 is a perspective view of one embodiment of an end segment of a structural element of FIG. 1.

Each elongate element 2 (FIG. 2) is of uniform cross-section throughout its length and has a shape in cross-section conforming to the letter "E" and comprises a longitudinally extending web portion 4 and a pair of flanges 6, 8 extending laterally from the web portion 4 and on opposite sides thereof. Each flange 6, 8 is hook-shaped and defines with a respective side of the web portion 4 a longitudinally extending channel, 12, 14 respectively, which conforms in cross-section to the cross-sectional configuration of a flange of an adjacent element, of the composite structure of FIG. 1 and is slidable therein upon transverse flexing of the molding structure.

The elongate, flexible element 2 may suitably be of extruded aluminum having dimensions in cross-section of approximately 0.44 by 0.25 inches overall in height by breadth. The material of composition and method of fabrication of the element 2 can vary, as can the dimensions, from application to application. It is important, however, that the composition be such as to give the element sufficient flexibility such that the entire composite structure formed therefrom will have the necessary transverse flexibility required for bending it.

The web portion 4 of the element 2 comprises an intermediate rib 16 and a pair of transverse portions 18, 20 the latter extending from one longitudinal edge of the rib 16 and are aligned to form a flat outer wall 22. The transverse portions 18, 20 are each attached to a respective one of the flanges 6, 8.

All adjacent elements 2 of the composite structure 10 are interconnected in inverted positions relative to one another, their respective outer walls 22 facing outwardly in opposite direction and parallel to one another. Similarly, all alternate elements face in the same direction and their flat outer walls lie on a common plane. The ribs 16 intrude between the flanges of alternate elements, their respective ends 24 terminating at the plane of the outer walls of the elements adjoining the rib 16.

For aesthetic reasons it may be desirable that the outer walls be contoured rather than flat and accordingly the outer walls of each element may be formed with a contour or pattern as desired.

Figure 3:
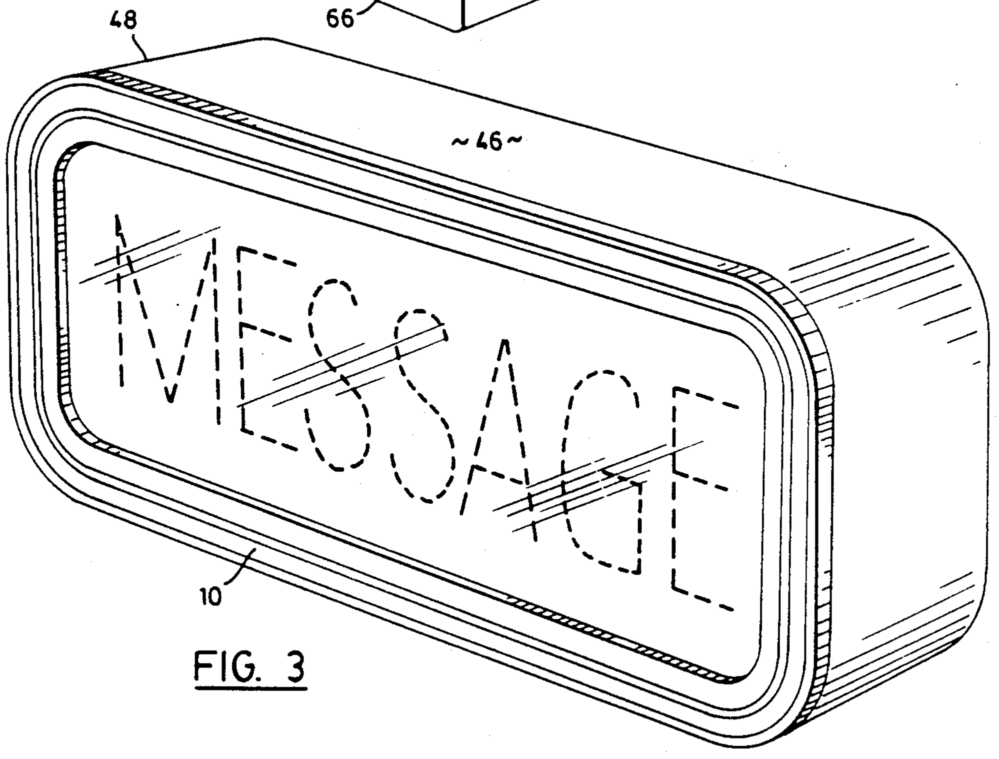
FIG. 3 is a perspective view of a composite structure in accordance with the invention, in use.

First and second elongate, flexible side elements 26 and 28 respectively, having a "C" shaped cross-section are provided for interconnection slidably in side by side relation with an adjacent element 2. Each of side elements 26 and 28 comprises a longitudinally extending web portion 30 and 32 respectively, a first hook-shaped flange 34 and 36 respectively, each of which extends laterally from one side of the respective web portion and a second flange 38 and 40, respectively, extending laterally from the opposite side of the respective web portion. A flat outer side wall 42 and 44 respectively, is formed by the second flange 38 and 40, to serve as a side wall of the composite molding structure 10. Each first hook-shaped flange 38, 40 is adapted to be keyed into the respective channel 12 and 14 of an adjacent element 2 and is slidable therein upon transverse flexing of the assembled composite molding structure. The second flange 38 of one side element 26 is extended laterally a length such as may be required to form an extended exterior side wall or cover of a frame or architectural member, or the side wall 46 of a display device 48 as shown in FIG. 3, while the balance of the composite structure 10 defines an outward facing retaining flange for the display device 48.

Figure 4:
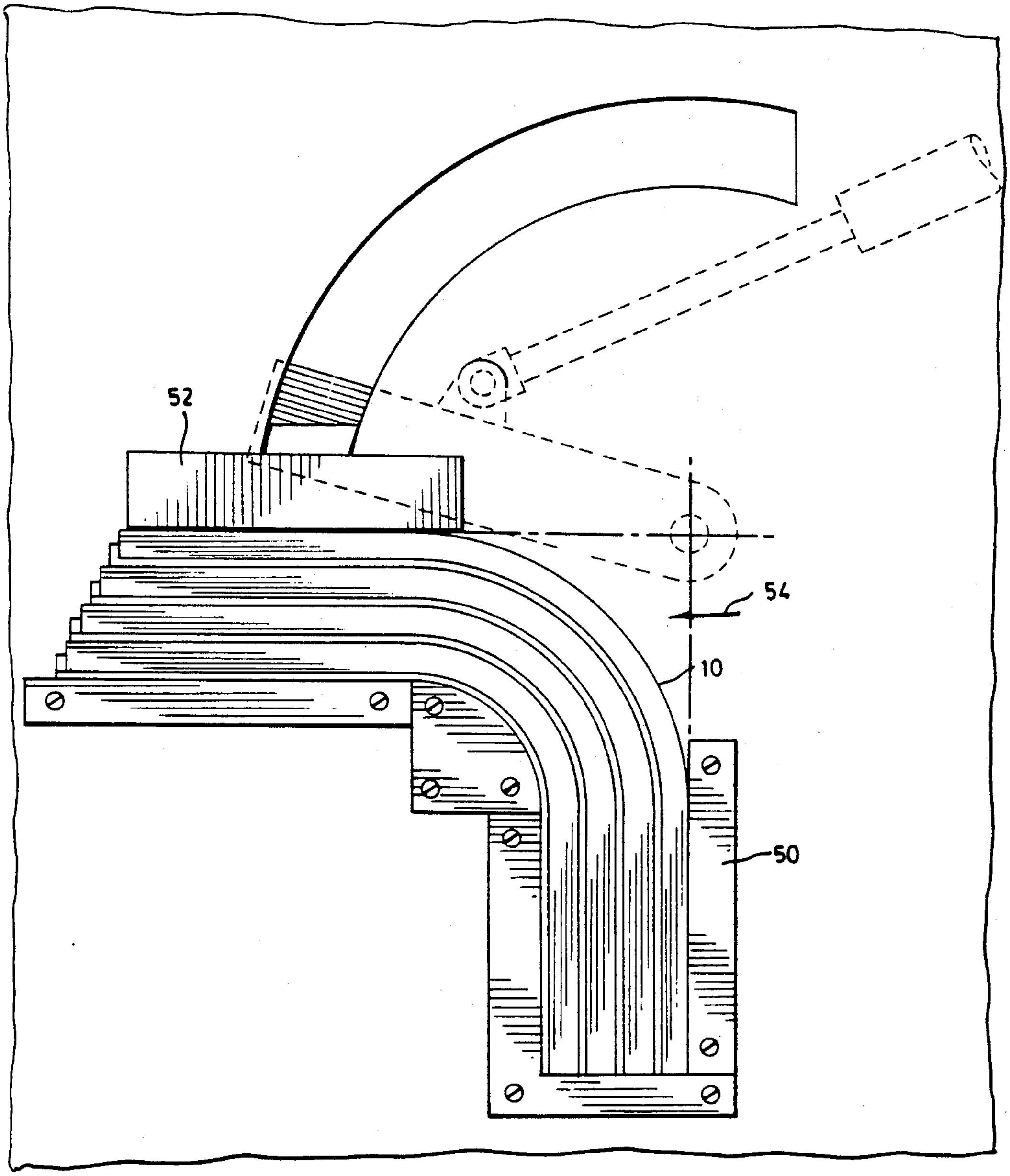
FIG. 4 is a perspective view of the structure of FIG. 3 during forming and illustrating a method of forming.

Turning to FIG. 4, forming of a curved composite molding structure 10 can be done by employing a suitable jig which comprises a stationary clamping member 50 to position and grip the structure 10 at one end, and a movable member 52 for exerting a lateral force on the opposite end of the structure and transversely thereto, as indicated by the arrow 54.

Methodwise, the curved composite molding structure is formed by slidably interconnecting two or more of the elements 2, and, if desired, side elements 26 and 28, thereby forming a composite molding structure, inserting one end of the composite molding structure so formed into the stationary clamping member 50 to permit the stationary clamping member to grip that end, and moving the movable member 52 to cause it to bend the opposite end of the structure 10 transversely.

During forming, individual adjacent elements 2 will slide upon one another to compensate for longitudinal dimensional changes between inner and outer radii along the plane of the bend.

Once the structure has been formed, the excess portion can be cut off as needed.

Figure 5:
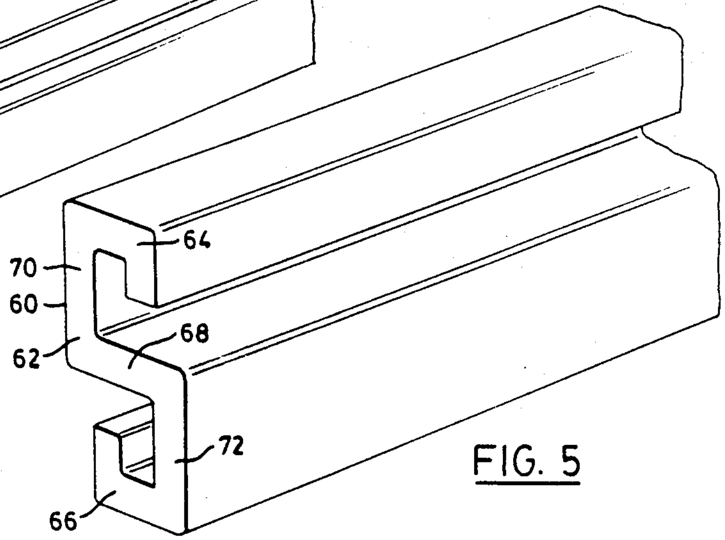
FIG. 5 is a perspective view of an alternate embodiment of a section of a structural element in accordance with the invention.

In FIG. 5 an alternate embodiment of a flexible elongate structural element 60, according to the invention has a generally "S" shaped cross-section, and comprises a longitudinally extending web portion 62 and a pair of flanges 64, 66 extending laterally from opposite sides of the web portion in opposite directions. The web portion comprises an intermediate rib 68, and a pair of transverse portions 70, 72 each attached to a respective one of the flanges 64, 66 and extending from opposite longitudinal edges of the intermediate rib 68.

A plurality of elements 60 are adapted to be slidably interconnected with one another to form a composite molding structure (not shown) which can be formed as described hereinbefore. It can be seen that both sides of each element 60 are identical and are universally interchangeable with one another, or, if desired, can be intermixed with one or more of the element 2, described above.

For forming a composite molding structure according to the invention, the structural elements can conveniently be supplied in the form of a kit comprising a plurality of the elements, provided in the lengths required for a particular application. Such a kit may include, for example, a number, as required, of the "E" shaped elements 2, together with a required number of "C" shaped side elements of the first and second type, 26 and 28, respectively. Alternatively, a kit may be made up of a required number of "S" shaped elements 60 or of a combination of the "E" and "S" shaped elements.

I claim:

1. A composite, elongate molding structure having transverse flexibility, comprising a plurality of elongate, flexible elements assembled in side by side relation, said elements being slidably interconnected with their longitudinal axes lying parallel to each other, each element being of uniform cross-section throughout its length and comprising a longitudinally extending web portion and a pair of flanges extending laterally from the web portion on opposite sides thereof, each flange defining with a respective side of the web portion a longitudinally extending channel conforming to the cross-sectional configuration of a flange of an adjacent element, said flange of said adjacent element being keyed into the channel and slidable therein upon transverse flexing of the molding structure.

2. A composite molding structure as in claim 1, wherein the elements are interchangeable with one another.

3. A composite molding structure as in claim 1, wherein the elements are identical to one another in cross-section.

4. A composite molding structure as in claim 1, wherein the web comprises an intermediate rib and a pair of transverse portions each attached to a respective one of said flanges, each said transverse portion extending from a longitudinal edge of the rib.

5. A composite molding structure as in claim 4, wherein said transverse portions extend from one longitudinal edge of the rib, said transverse portions being aligned to form a flat outer wall.

6. A composite molding structure as in claim 4, wherein said transverse portions extend from opposite longitudinal edges of the rib.

7. A composite molding structure as in claim 5 or 6, wherein each flange is hook-shaped, and each longitudinally extending channel defines a keyway formed between the rib and the respective flange.

8. A composite molding structure as in claim 1, further comprising first and second elongate, flexible side elements, each being slidably interconnectable in a side by side relation with an adjacent one of said elongate, flexible elements, said first and second elongate, flexible side elements each comprising a longitudinally extending web portion, a first, hook-shaped flange extending laterally from one side of the web portion, and a second flange extending laterally from the opposite side of the web portion, and forming a flat outer wall, said first, hook-shaped flange being adapted to be keyed into the respective channel of the adjacent flexible element, and slidable therein upon transverse flexing of the composite molding structure.

9. A method of making a composite elongate molding structure, comprising:

slidably interconnecting a plurality of elongate, flexible elements of uniform cross-sections along their lengths in a side-by-side relation with their longitudinal axes lying parallel to each other, each of said elements comprising a pair of flanges extending laterally from opposite sides of a web portion, to define longitudinally extending channels into which a flange of an adjacent element can be keyed, thereby forming a composite molding structure;

gripping one end of the composite molding structure; and bending the other end of the composite molding structure transversely, thereby causing the elongate flexible elements to slide upon each other.

10. A kit for making a composite elongate molding structure having transverse flexibility, comprising a plurality of elongate, flexible elements adapted to be assembled in side by side relation, said elements being slidably interconnectable with their longitudinal axes lying parallel to each other, each element being of uniform cross-section throughout its length and comprising a longitudinally extending web portion and a pair of flanges extending laterally from the web portion in opposite sides thereof, each flange defining with a respective side of the web portion a longitudinally extending channel conforming to the cross-sectional configuration of a flange of another of said elements, said flange of said other element being adapted to be keyed into the channel, and slidable therein upon transverse flexing of the composite molding structure.

11. A kit as in claim 10, wherein the elements are interchangeable with one another.

12. A kit as in claim 10, wherein the elements are identical to one another in cross-section.

13. A kit as in claim 10, wherein the web portion comprises an intermediate rib and a pair of transverse portions each attached to a respective one of said flanges, each said transverse portion extending from a longitudinal edge of the rib.

14. A kit as in claim 10, wherein said transverse portions extend from one longitudinal edge of the rib, said transverse portions being aligned to form a flat outer wall.

15. A kit as in claim 10, wherein said transverse portions extend from opposite longitudinal edges of the rib.

16. A kit as in claim 10, wherein said flange is hook-shaped and each longitudinally extending channel defines a keyway formed between the rib and the respective flange.

17. A kit as in claim 10 further comprising first and second elongate flexible side elements each being slidably interconnectable in a side by side relation with an adjacent one of said elongate, flexible elements, said first and second elongate flexible side elements each comprising a longitudinally extending web portion, a first, hook-shaped flange extending laterally from one side of the web, and a second flange extending laterally from the opposite side of the web portion, and forming a flat outer wall, said first, hook-shaped flange being adapted to be keyed into the respective channel of the adjacent flexible element, and slidable therein upon transverse flexing of the composite molding structure.

* * * * *